July 30, 1957 — G. C. PEARCE — 2,801,325
DOMESTIC APPLIANCE
Filed May 18, 1954 — 2 Sheets-Sheet 1

INVENTOR.
George C. Pearce
BY R. R. Cantor
His Attorney

July 30, 1957
G. C. PEARCE
2,801,325
DOMESTIC APPLIANCE
Filed May 18, 1954
2 Sheets-Sheet 2
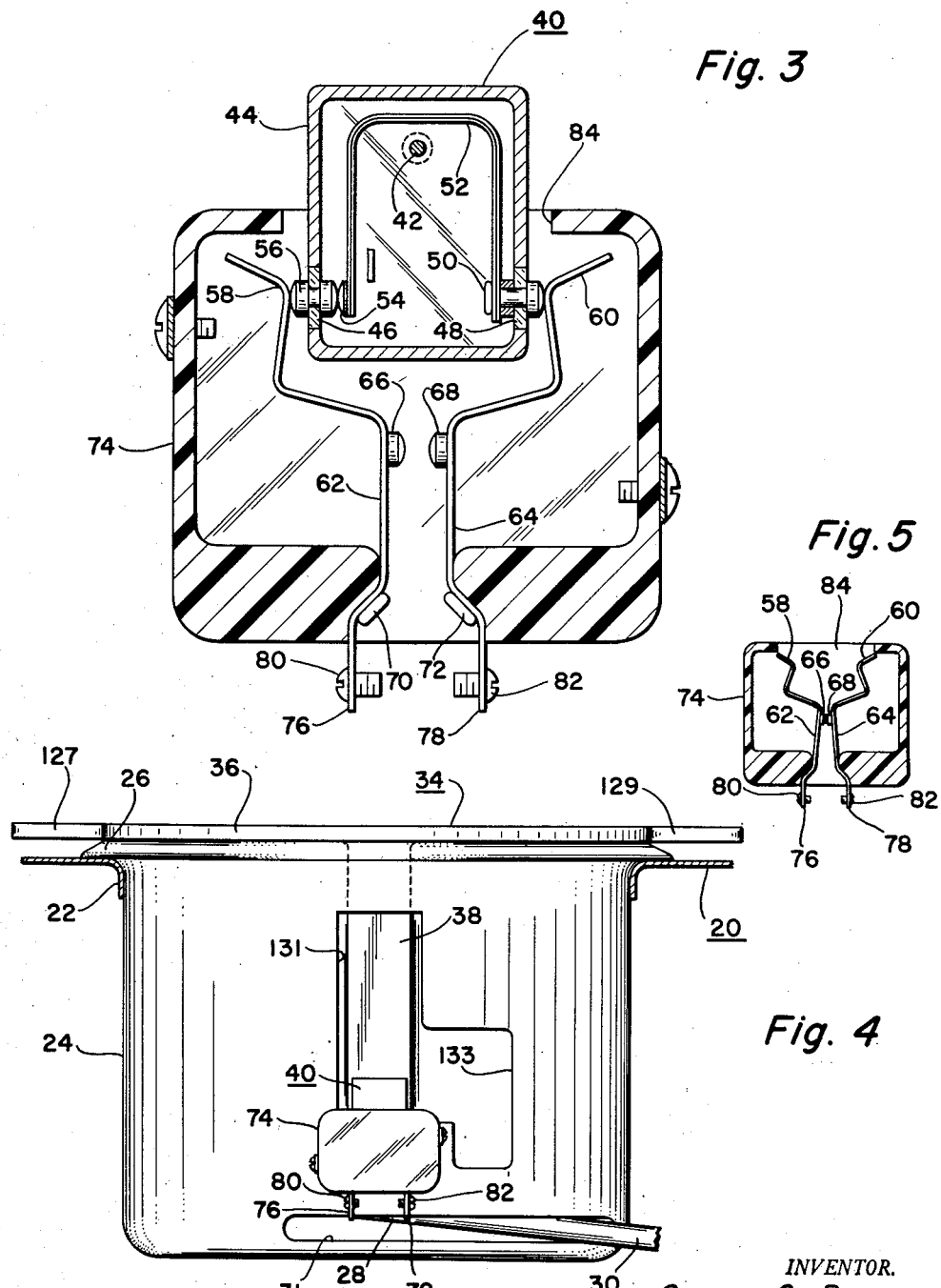
INVENTOR.
George C. Pearce
BY R. V. Candor
His Attorney

United States Patent Office 2,801,325
Patented July 30, 1957

2,801,325

DOMESTIC APPLIANCE

George C. Pearce, Dayton, Ohio, assignor to General Motors Corporation, Detroit, Mich., a corporation of Delaware Application May 18, 1954, Serial No. 430,489

7 Claims. (Cl. 219—43)

This invention relates to a domestic appliance and more particularly to a deep well cooker provided with a thermostatic control.

For many purposes thermostats are unnecessary for deep well cookers but for deep fat frying a simple thermostat is desirable.

It is an object of my invention to provide a simple arrangement whereby a deep well cooker may be provided with a simple direct thermostat set for deep fat frying which will not limit the use of the cooker for other purposes.

It is another object of my invention to provide a simple arrangement for connecting the thermostat in series with the heater of a deep well cooker or removing the thermostat from the heater circuit and connecting the heater directly through manual controls to the power line.

These and other objects are attained in the form shown wherein a simple thermostat is provided in the form of a boss on the outer cylindrical wall of the cooking utensil which is adapted to contact and spread a set for normally closed contacts in series with the heater circuit. In this arrangement the thermostat responsive to the temperature of the utensil and its contents will control the energization of the heater, but removal of the receptacle from the well or movement of the thermostat and receptacle to another axial position removes the thermostat from the spring contacts and allows the spring contacts to close and connect the heater to the manual controls.

Further objects and advantages of the present invention will be apparent from the following description, reference being had to the accompanying drawings, wherein a preferred form of the invention is clearly shown.

In the drawings:

Figure 3 is a sectional view taken substantially along the line 3—3 of Figure 1;

Figure 4 is a view in elevation of the cooker looking in the direction of the arrow 4 in Figure 2, showing the thermostat and the cooperating spring contactor; and Figure 5 is a fragmentary sectional view also taken along the line 3—3 but showing the contacts with the thermostat removed.

Figure 1:
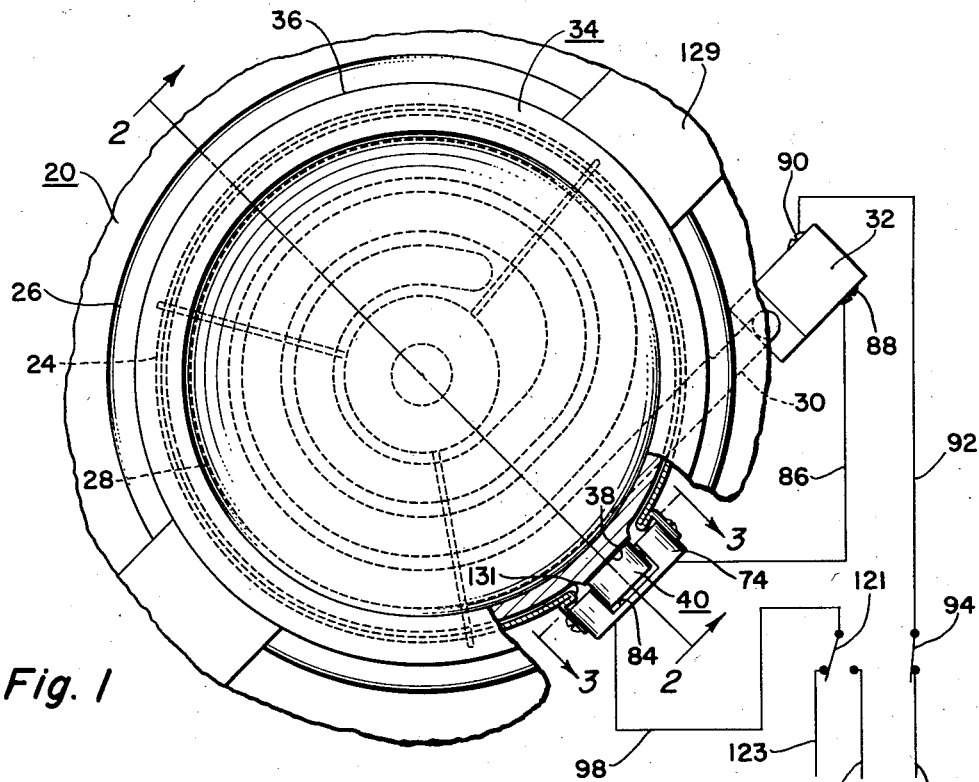
Figure 1 is a fragmentary top view of a domestic electric range showing a deep well cooker provided with a thermostatic control.
Figure 2:
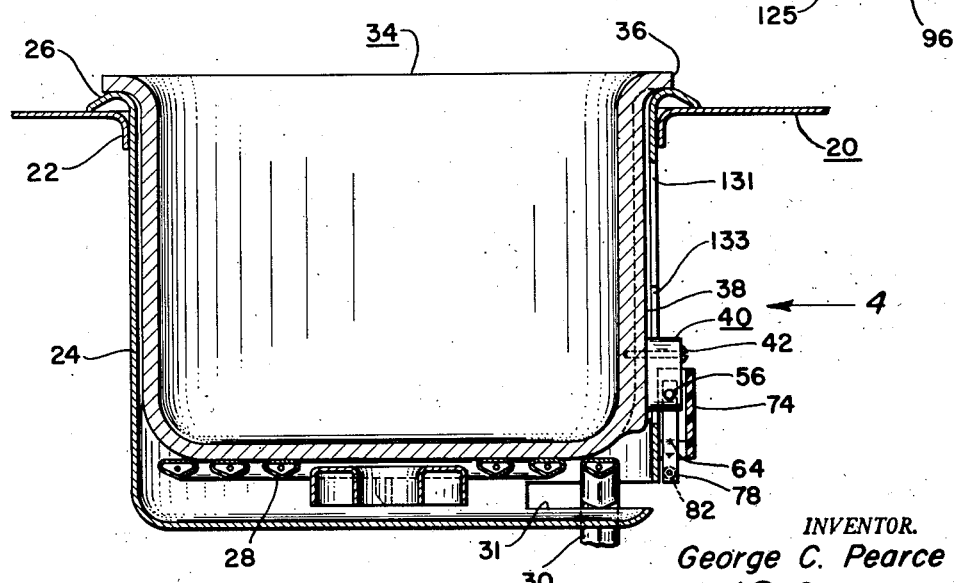
Figure 2 is a sectional view taken substantially along the line 2—2 of Figure 1.

Referring now to the drawings and more particularly to Figure 1, there is shown a portion 20 of the range top of a domestic electric range. This range top 20 is provided with a downwardly flanged aperture 22 which receives the upper portion of a deep well 24 provided with an outer flange 26 which overlies the edges of flanged aperture 22. This deep well is generally cylindrical in shape with a substantially flat bottom. Mounted upon the flat bottom of the well 24 is a sheathed tubular type of electric heater 28 having a terminal portion 30 extending through an arcuate slot 31 provided in the well 24 just above the flat bottom. The terminal portion 30 is provided with a terminal block 32 provided with two terminal connections.

The deep well 24 is provided with a cylindrical shaped utensil 34 adapted to rest on the flat top surface of the electric heater 28 and has a flange 36 adapted to extend over the flange 26 of the well 24. The utensil 34 is preferably made of heavy cast or sheet aluminum so as to provide a relatively heavy thermal mass capable of giving up considerable heat to the fat when the temperature drops suddenly when immersing potatoes to be French fried.

According to my invention on one side of the utensil 34 I provide a flat surface 38 to which is fastened a simple non-adjustable thermostat 40. This thermostat 40 may be fastened by the screw 42. The wall of the thermostat 40 may be in the shape of a flat rectangular box. The walls of this box may be made of some suitable electrical insulating material which has good heat conduction properties. However to improve the heat conducting properties the box-shaped enclosure 44 is made of metal and provided with insulating inserts 46 and 48 in the opposite walls of the box 44. The insulating insert 48 is provided with an anchorage 50 for one leg of the inverted U-shaped bimetal member 52. This bimetal member has its high expanding side turned outwardly. The opposite leg of the bimetal 52 is provided with a switch contact 54 adapted to engage the double contact 56 extending on opposite sides of the insulating insert 46. When the insulating utensil 34 reaches the maximum temperature for deep fat frying, the bimetal 52 will curl and move the contact 54 away from the contact 56. While I have shown a simple U-shaped bimetal switch, this is merely an example of one form of simple compact thermostatic control which may be used.

When the thermostat 40 is made effective, the contact 56 and the anchorage 50 are in engagement with the prongs 58 and 60 of the spring members 62 and 64 which carry the contacts 66 and 68. These spring members 62 and 64 have an inherent spring force which normally moves the contacts 66 and 68 into engagement as shown in Figure 5. These spring members 62 and 64 are anchored by rivets 70 and 72 to an insulating housing 74 enclosing the spring members 62 and 64. The spring members 62 and 64 are provided with extensions 76 and 78 having binding screws 80 and 82 thereon. The upper portion of the housing 74 is provided with an opening 84 for admitting the thermostat 40.

As indicated in Figure 1, the binding screw 80 is connected by a conductor 86 to a terminal 88 on the terminal block 32 of the electric heater 28. A second terminal 90 upon the terminal block 32 is connected by a conductor 92 to a manually controllable "off" and "on" switch 94, preferably controlled from the front of the range top. This switch 94 is connected to one terminal 96 of a three wire single phase power supply. The binding screw 82 is connected by a conductor 98 to the common switch member of a manually operated double throw switch 121 which is adapted to connect to either a high voltage supply conductor 123 or a neutral supply conductor 125 for applying either 235 volts or 117 volts to the heater 28 under the control of the thermostat 40. The manual control preferably has an "off" position in which the switch 121 is out of contact with either of the conductors 123 and 125 or is connected to the neutral conductor 125 for grounding purposes.

The utensil 34 may be readily removed by lifting the handles 127 and 129 thereby lifting the thermostat 40 out from between the spring members 62 and 64. A long vertical slot 131 is provided in the receptacle well 24 in which the thermostat 40 is vertically movable until the receptacle 34 can be tilted sufficiently to accomplish its complete removal. This complete removal is accomplished by tilting the receptacle after the thermostat has reached the top of the slot 134 and moving the receptacle laterally upwardly away from the slot 131 until the thermostat 40 is free of the slot 131. When this is done the spring members 62 and 64 will spring toward each other until the contacts 66 and 68 are engaged. This will place the heater 28 directly under the control of the manually operable switch means 94 and 121 without any control by the thermostat 40.

If it should be desired to use the utensil 34 without any thermostatic control, the utensil 34 is lifted by the handles 129 and 127 until the thermostat 40 is free of the receptacle 74 and thence rotated into the lateral extension 133 of the slot 131 and then lowered into contact with the top of the heater 28. This will cause the contacts in the receptacle 74 to be closed as shown in Figure 5 to connect the heater 28 directly to the manually operable switches 94 and 121. However, if it is not desired to use the utensil 34 without using the thermostat 40, the lateral extension of the slot 133 is omitted. Both sides of the slot 131 will then guide the thermostat 40 in its insertion in the receptacle 74.

While the form of embodiment of the invention as herein disclosed constitutes a preferred form, it is to be understood that other forms might be adopted, as may come within the scope of the claims which follow.

What is claimed is as follows:

1. A deep well cooker for a domestic electric range including a well provided with an electric heater, one side of said well being provided with a set of spring mountings having contact portions spring biased to the closed position, conductors connecting said spring mountings in circuit with said heater, a removable cooking utensil within said well, a thermostat assembly fixed to said utensil and having oppositely facing external contact connections projecting from the side wall thereof located between and being contacted by said spring mounted contact portions.

2. A deep well cooker for a domestic electric range including a well provided with an electric heater, one side of said well being provided with a set of spring mountings having contact portions spring biased to the closed position, conductors connecting said spring mountings in circuit with said heater, a removable cooking utensil within said well, a thermostat assembly fixed to said utensil and having oppositely facing external contact connections projecting from the side wall thereof located between and being contacted by said spring mounted contact portions, said spring mountings being provided with upwardly diverging prong extensions adapted to cooperate with said external contact connections to spread the contact portions and to facilitate engagement therebetween.

3. A deep well cooker for a domestic electric range including a well provided with an electric heater, one side of said well being provided with a set of spring mountings having contact portions spring biased to the closed position, conductors connecting said spring mountings in circuit with said heater, a removable cooking utensil within said well, a thermostat assembly fixed to said utensil and having oppositely facing external contact connections projecting from the side wall thereof located between and being contacted by said spring mounted contact portions, said well being provided with a vertical wall provided with a disengaging slot extending upwardly from the location of said contact portions, said external contact connections on said side wall of said utensil extending through said slot into engagement with said contact portions.

4. A deep well cooker for a domestic electric range including a well provided with an electric heater, one side of said well being provided with a set of spring mountings having contact portions spring biased to the closed position, conductors connecting said spring mountings in circuit with said heater, a removable cooking utensil within said well, a thermostat assembly fixed to said utensil and having oppositely facing external contact connections projecting from the side wall thereof located between and being contacted by said spring mounted contact portions, said well being provided with a vertical wall provided with a disengaging slot extending upwardly from the location of said contact portions, said external contact connections on said side wall of said utensil extending through said slot into engagement with said contact portions, said slot having an extension located at one side of said contact portions for receiving said external contact connections when disconnected from said contact portions.

5. A deep well cooker for a domestic electric range including a well provided with an electric heater, a normally closed switch means mounted on said well and connected to control said heater, a removable cooking utensil within said well, a thermostat assembly fixed to the utensil, said thermostat assembly being provided with means for opening and connecting itself across said switch means to control said heater.

6. A deep well cooker for a domestic electric range including a well provided with an electric heater, a normally closed switch means mounted on said well and connected to control said heater, a removable cooking utensil within said well, a thermostat assembly fixed to said utensil, said thermostat assembly being provided with external contact connections for holding open and contacting said switch means to connect itself across the open switch means.

7. A deep well cooker for a domestic electric range including a well provided with an electric heater, a normally closed switch means mounted on said well and connected in series with said heater, a removable cooking utensil within said well, a thermostat assembly fixed to said utensil, said switch means including a set of spring mounted contacts spring propelled to the closed position, said thermostat assembly being provided with external contact connections spreading said contacts apart and making contact with said contacts to connect said thermostat assembly in series with said heater.

References Cited in the file of this patent

UNITED STATES PATENTS

| | | |
|---|---|---|
| 2,269,689 | Reichold | Jan. 13, 1942 |
| 2,422,974 | Newell | June 24, 1947 |
| 2,430,196 | Vaughan | Nov. 4, 1947 |
| 2,480,827 | Armstrong | Sept. 6, 1949 |
| 2,528,579 | Clark | Nov. 7, 1950 |